United States Patent
Raut et al.

(10) Patent No.: US 7,633,961 B2
(45) Date of Patent: Dec. 15, 2009

(54) EDGE-ROUTER SCALING FOR BGP PEERING WITH VIRTUAL PRIVATE ROUTED NETWORKS (VPRN)

(75) Inventors: Devendra Y. Raut, Cupertino, CA (US); Kent Choto Wong, San Jose, CA (US); Arijit Sarcar, Sunnyvale, CA (US)

(73) Assignee: Alcatel Lucent, Paris (FR)

(*) Notice: Subject to any disclaimer, the term of this patent is extended or adjusted under 35 U.S.C. 154(b) by 952 days.

(21) Appl. No.: 10/820,497

(22) Filed: Apr. 7, 2004

(65) Prior Publication Data
US 2005/0226213 A1    Oct. 13, 2005

(51) Int. Cl.
*H04L 12/56* (2006.01)

(52) U.S. Cl. ................................. 370/412; 370/401

(58) Field of Classification Search .............. 370/217, 370/392, 230, 231, 401; 375/240.28; 379/202.61; 709/219, 242; 726/11; 718/103
See application file for complete search history.

(56) References Cited

U.S. PATENT DOCUMENTS

| | | | | |
|---|---|---|---|---|
| 5,434,913 | A * | 7/1995 | Tung et al. ............. | 379/202.01 |
| 5,528,513 | A * | 6/1996 | Vaitzblit et al. .......... | 718/103 |
| 6,339,595 | B1 * | 1/2002 | Rekhter et al. ........... | 370/392 |
| 6,625,750 | B1 * | 9/2003 | Duso et al. ............. | 714/11 |
| 7,039,720 | B2 * | 5/2006 | Alfieri et al. ............ | 709/242 |
| 7,200,114 | B1 * | 4/2007 | Tse-Au .................. | 370/231 |
| 7,242,665 | B2 * | 7/2007 | Langille et al. .......... | 370/217 |
| 7,382,787 | B1 * | 6/2008 | Barnes et al. ............ | 370/401 |
| 2002/0097730 | A1 | 7/2002 | Langille et al. | |
| 2002/0099849 | A1 | 7/2002 | Alfieri et al. | |
| 2003/0112755 | A1 * | 6/2003 | McDysan ............... | 370/230 |
| 2003/0126233 | A1 * | 7/2003 | Bryers et al. ............ | 709/219 |
| 2003/0210694 | A1 * | 11/2003 | Jayaraman et al. ........ | 370/392 |
| 2004/0228414 | A1 * | 11/2004 | Keck et al. .............. | 375/240.28 |
| 2005/0138622 | A1 * | 6/2005 | McAlpine et al. ......... | 718/100 |
| 2006/0174336 | A1 * | 8/2006 | Chen .................... | 726/11 |

OTHER PUBLICATIONS

Redback Networks, "Multiple Contexts and Virtual Interfaces", Online, 2002, pp. 1-12, XP002333700, Retrieved from the Internet: URL:http://www.redback.com/resources/pdf/appnote-contexts.pdf.

* cited by examiner

*Primary Examiner*—Albert T Chou
*Assistant Examiner*—Chi H Pham
(74) *Attorney, Agent, or Firm*—Central Coast Patent Agency

(57) ABSTRACT

An edge router in a packet network has a processor resource for processing events, at least one scheduler managing all events for processing by the processor resource, at least one ready list, and individual event pipelines dedicated to individual ones of BGP peers. Events received for processing are posted in their associated event pipelines according to the source of the events, pipelines having events to be processed insert a flag in the ready list and the scheduler repetitively scans the ready list sequentially, and releases events to the processor resource with preset limitation per pipeline.

9 Claims, 3 Drawing Sheets

EDGE-ROUTER SCALING FOR BGP PEERING WITH VIRTUAL PRIVATE ROUTED NETWORKS (VPRN)

FIELD OF THE INVENTION

The present invention is in the general field of Internet Protocol (IP), and pertains more particularly to creating and managing virtual routers in Internet-connected edge routers, and peering with large numbers of external private networks.

BACKGROUND OF THE INVENTION

The present invention is in the field generally of communication in packet networks, particularly in the area of Layer 3 Virtual Private Networks (also known as IP VPN) accomplished over the well-known Internet network. In packet routing in the Internet network, and with private routers connected to the Internet, certain well-known protocols are used to manage tasks, such as maintenance of routing tables describing the moment-to-moment topology of the network, for the purpose of selecting next destination for packets at any node, for example. One such protocol is known in the art as Border Gateway Protocol (BGP), and BGP is involved intimately with the present invention in various embodiments. BGP is well-known, so no effort is made in this disclosure to teach the concepts and procedures for BGP, except for occasional reference to the protocol and its high-level features.

An application of IP VPN growing in demand, and therefore an object of attention by developers and manufacturers of Internet routers and providers of Internet services, is in provision of services at edge routers for peering with virtual private routed networks (VPRN). A VPRN may be thought of as a network within the Internet network, wherein a defined enterprise or organization may use the network almost as though there were no other participants. This is of great value to geographically diverse organizations, because such organizations may have connections among remote campuses almost as though all the network nodes were in the same building. The necessary computer power to manage such a network is greatly reduced over simply sharing the Internet on an individual basis, because the necessary topology and communication between intermediate hops, and the like, is greatly reduced as well.

SUMMARY OF THE INVENTION

In an embodiment of the present invention an edge router in a packet network is provided, comprising a processor resource for processing events, at least one scheduler managing all events for processing by the processor resource, at least one ready list, and individual event pipelines dedicated to individual ones of BGP peers. Events received for processing are posted in their associated event pipelines according to the source of the events, pipelines having events to be processed insert a flag in the ready list and the scheduler repetitively scans the ready list sequentially, and releases events to the processor resource with preset limitation per pipeline.

In some embodiments individual ones of the BGP peers are virtual private routed networks (VPRNs) away from the packet network. Also in some embodiments the preset limitation is a time limitation, and in others the preset limitation is a buffer limitation.

In some embodiments there may be a first and a second scheduler, a first and a second ready list, and pipelines dedicated to events associated with both VPRNs and core BGP peers in the service provider network. wherein the pipelines associated with VPRNs communicate with the first scheduler and the first ready list, and the pipelines associated with the core BGP peers communicate with the second scheduler and the second ready list.

In another aspect of the invention a method for processing events in BGP peering in an edge router in a packet network is provided, comprising acts of (a) placing received events associated with BGP peers in dedicated pipelines according to the BGP source; (b) flagging a ready list by individual pipelines having events ready to be processed; and (c) scanning the ready list sequentially and repeatedly by a scheduler, the scheduler sending events for each pipeline to be processed to a processing resource according to a preset limitation per pipeline.

In one embodiment of the method individual ones of the BGP peers are virtual private routed networks (VPRNs) away from the packet network. Also in an in act (c) the preset limitation is a time limitation, or in some embodiments a buffer limitation.

In some embodiments of the method there are a first and a second scheduler, a first and a second ready list, and pipelines dedicated to events associated with both VPRNs and core BGP peers in the service provider network. In this case the pipelines associated with VPRNs communicate with the first scheduler and the first ready list, and the pipelines associated with the core BGP peers communicate with the second scheduler and the second ready list.

In another aspect of the invention a machine-readable medium is provided having stored thereon a set of instructions that cause a machine to perform a method for processing events in BGP peering in an edge router in a packet network, including (a) placing received events associated with BGP peers in dedicated pipelines according to the BGP source; (b) flagging a ready list by individual pipelines having events ready to be processed; and (c) scanning the ready list sequentially and repeatedly by a scheduler, the scheduler sending events for each pipeline to be processed to a processing resource according to a preset limitation per pipeline.

In some embodiments individual ones of the BGP peers are virtual private routed networks (VPRNs) away from the packet network. In some embodiments in act (c) the preset limitation is a time limitation, and in some embodiments in act (c) the preset limitation is a buffer limitation.

Further in some embodiments of the method there are a first and a second scheduler, a first and a second ready list, and pipelines dedicated to events associated with both VPRNs and core BGB peers in the service provider network, and the pipelines associated with VPRNs communicate with the first scheduler and the first ready list, and the pipelines associated with the core BGP peers communicate with the second scheduler and the second ready list.

In various embodiments of the invention taught in enabling detail below, for the first time an edge router is enabled to efficiently handle ten thousand and more VPRNs.

BRIEF DESCRIPTION OF THE DRAWING FIGURES

DESCRIPTION OF THE PREFERRED EMBODIMENTS

Figure 1:
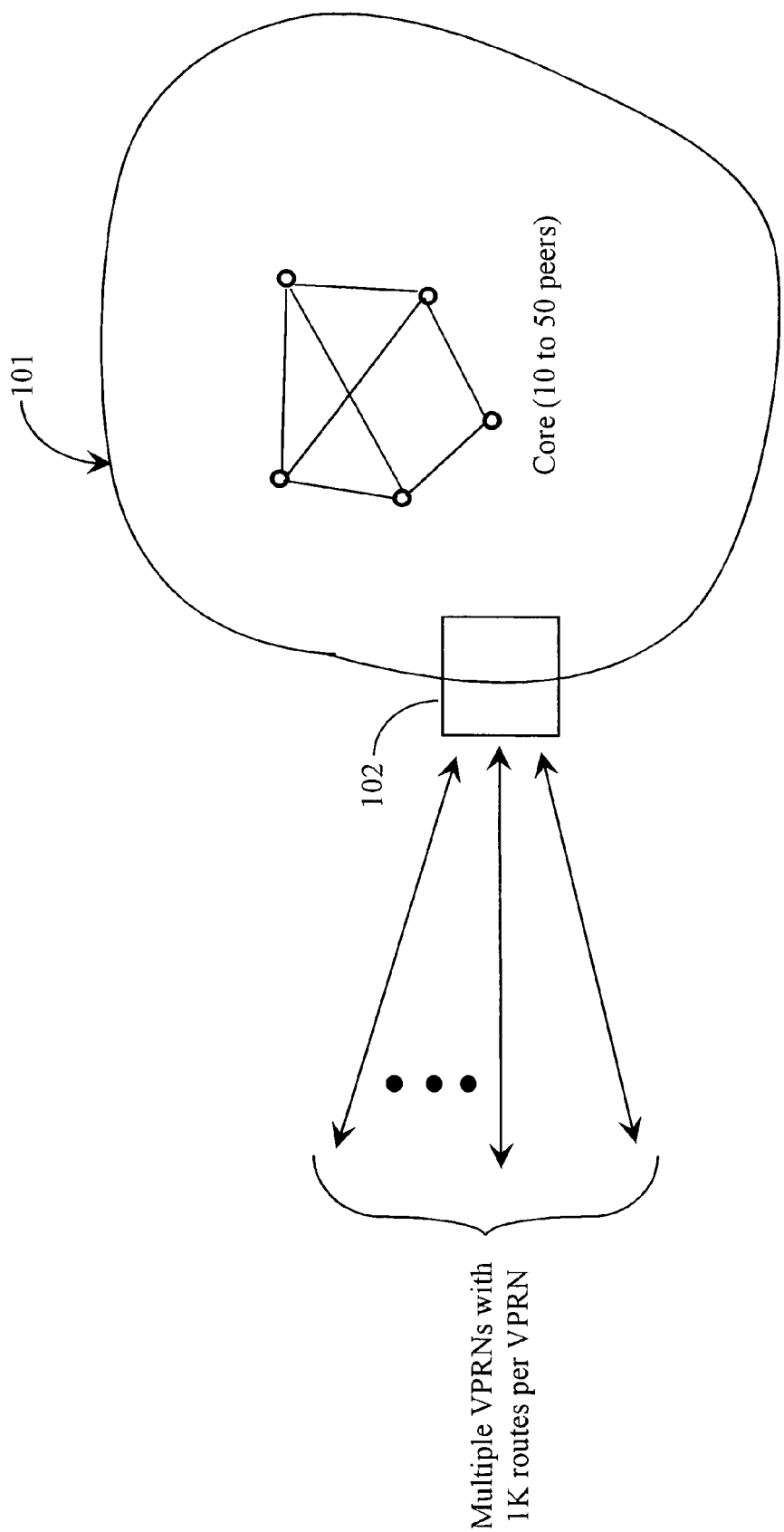
FIG. 1 is a diagram of an edge router operating according to an embodiment of the present invention.

FIG. 1 is a diagram of an edge router 102 operating according to an embodiment of the present invention. Edge router 102 is maintaining peering by BGP with typically ten to fifty core routers in network 101, which is a service provider network, may be considered a subset of the Internet network in many embodiments of the invention.

Figure 2:
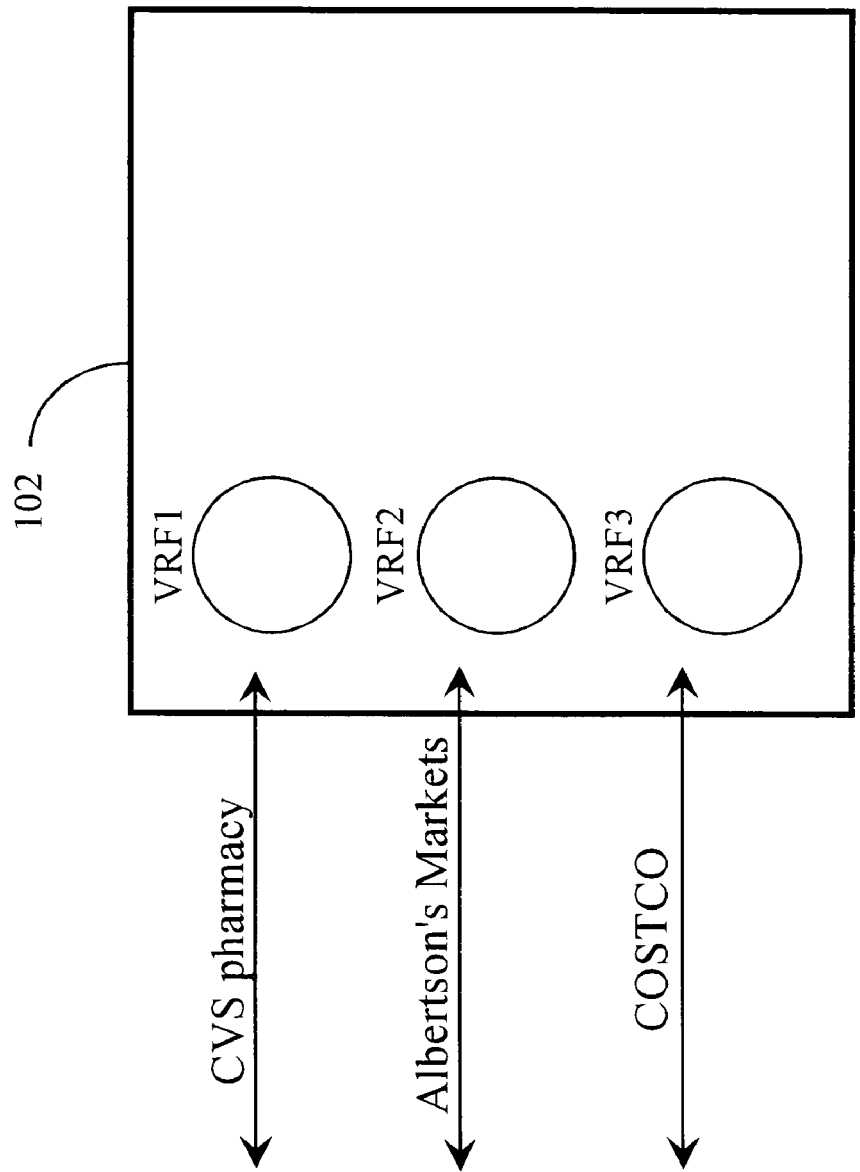
FIG. 2 is a diagram of edge router 102 showing virtual router forwarding (VRF) tables dedicated to individual clients of a service provider.

FIG. 2 is a diagram of edge router 102 showing three virtual router forwarding (VRF) tables labeled VRF 1, VRF 2 and VRF 3 maintained in router 102 and dedicated to individual clients of the service provider. In this case the clients are identified as CVS Pharmacy, Albertson's Markets and COSTCO, but these are exemplary only, and it will be apparent to the skilled artisan that there will typically be many more than three such clients supported by each edge router. The maintenance of VRFs is well-known in the art, and these are tables that must be continually updated by BGP messaging in operation to efficiently route packets for client communications.

A problem in the art is that most edge routers are computing machines with a single CPU, and all of the computer processes, including messaging, updating of tables, and packet identification and forwarding must be scheduled through the single processing resource. As a result there is a practical limitation on the number of VRFs that can be supported and therefore the number of clients that can be supported without well-known problems such as head-of-line blocking and throttling, which problems adversely affect communication characteristics for the clients.

Most providers can handle efficiently many more than the three clients indicated in FIG. 2, but problems in most all conventional state-of-the-art machines become apparent at perhaps two hundred clients. There are, of course, solutions to this limitation that have been proposed and used, such as bringing additional edge routers on line at a single edge location, developing and implementing parallel processor routers, and developing and implementing scalable routers. All of these alternatives to provide efficient service to many more clients are expensive and cumbersome.

It is a goal of the present invention to greatly increase the number of clients that may be well served by an edge router without resorting to hardware solutions, so existing, single CPU machines may serve thousands of clients. IN one embodiment of the present invention as many as ten thousand clients are served in BGP peering without router performance deterioration.

Figure 3:
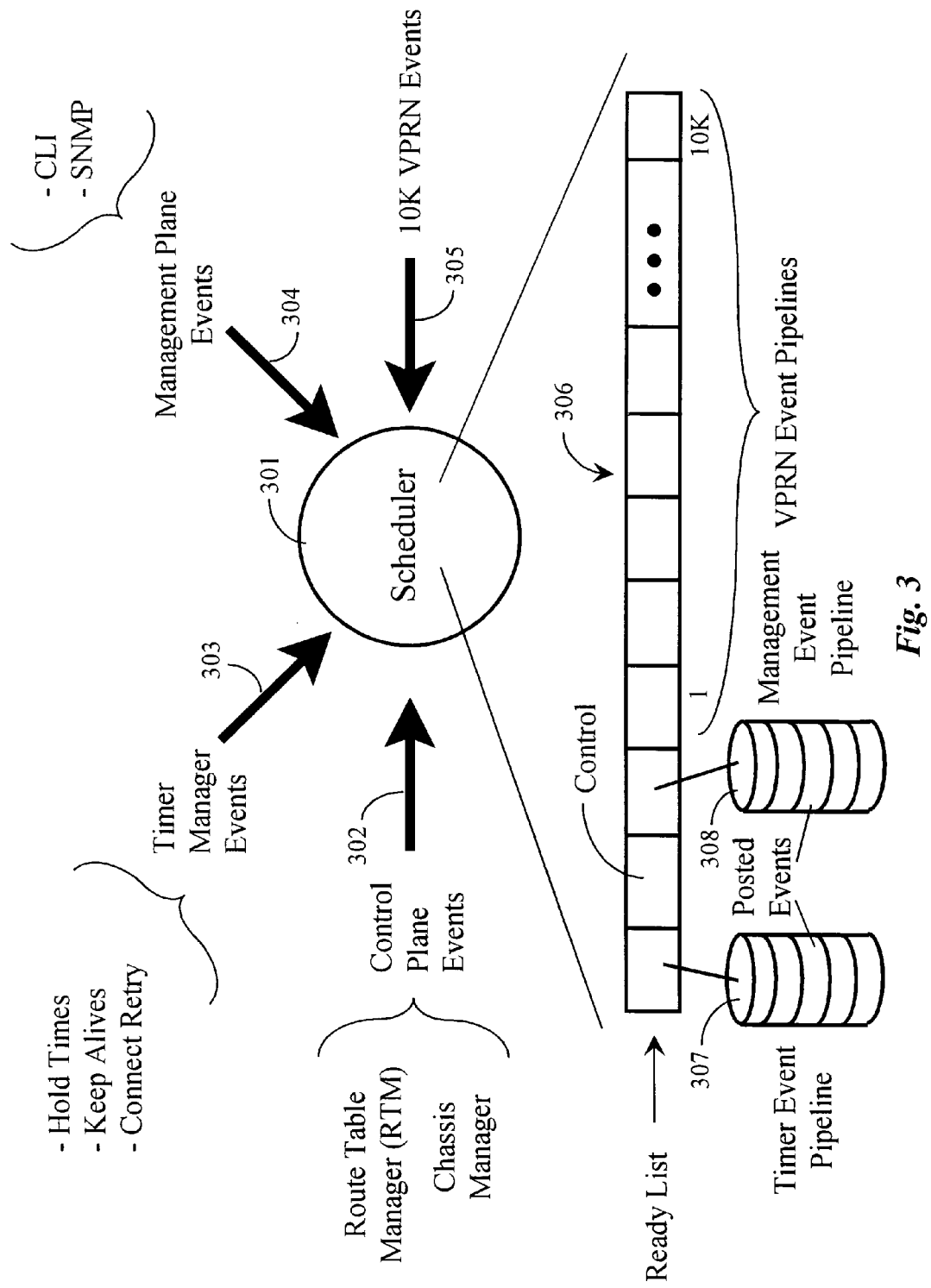
FIG. 3 is a diagram showing a process in an edge router in an embodiment of the invention for managing BGP peering with virtual routed private networks.

FIG. 3 is a diagram showing a process in an edge router in an embodiment of the invention for managing BGP peering with thousands of VPRNs without performance deterioration. In one embodiment of the invention the logic for accomplishing the invention is provided as an operating system for the edge router. In another embodiment the logic is provided as a software application running on the edge router for managing BGP peering with VPRNs, and other applications manage other operations of the router, such as packet handling for individual users.

In either case, in the logic, a scheduling process 301 receives events from the control plane, management plane, timer manager sources, and from the VPRNs. All received events are posted by the scheduler in dedicated event pipelines corresponding to their sources. When a pipeline has posted events, and only when it has posted events, that pipeline inserts its own file descriptor in ready list 306. Scheduler 301 cycles through ready list 306 and services only those pipelines that have inserted their file descriptors in the ready list. The cycling is controlled to process as many events as may be processed within a preset limit, such as a runtime limit, for example, or a maximum number of buffers are utilized.

In this manner all events for BGB peering with as many as ten thousand peers may be efficiently processed without degradation. Also completely fair scheduling is accomplished, there is no head-of-line blocking, and a busy BGP peer will not throttle operations for other clients.

In FIG. 3 only scheduling for VPRNs to one side of the edge router is illustrated. In embodiments of the invention a similar scheduler is implemented for BGP peering with core routers of the service provider's network. FIG. 3 serves to illustrate the process with core routers as well, by replacing the VPRN event pipelines with pipelines for the BGP peers in the core. In this case a first and second scheduler and first and second ready list are provided for VPRNs and core events, respectively. In some embodiments each of the scheduling processes, one for the core and one for the VPRNs, receives fifty percent of the computing resources of the router. In some embodiments the computing resources can be shared differently, granting more computing power to one side than to the other.

The system described in enabling detail above has been shown to be scalable to several thousands of VPRNs in tests, with potential to scale to tens of thousands of VPRNs and still provide fair scheduling among VPRN BGP peers, with all events scheduled as non-blocking. It will be apparent to the skilled artisan that there are many alterations in detail that may be made in embodiments described without departing from the invention. For example, there are many differences in the way edge routers may be constructed, and in the manner in which software may be created and implemented. Different software engineers, for example, may accomplish essentially the same functionality in a variety of ways of programming. Logic may also be accomplished in hardware as well as software. Therefore the invention should be accorded the scope of the claims that follow.

What is claimed is:

1. An edge router operating Border Gateway Protocol (BGP) in a packet network comprising:
    a processor resource for processing events;
    a first and a second scheduler managing events for processing by the processor resource;
    a first and a second ready list dedicated respectively to the first and second scheduler; and
    individual event pipelines dedicated to individual ones of BGP peers;
    wherein individual ones of the BGP peers are virtual private routed networks (VPRNs), pipelines dedicated to VPRNs communicate with the first scheduler and ready list, pipelines dedicated to BGP peers that are not VPRNs communicate with the second scheduler and ready list, and wherein events received for processing are posted in their dedicated event pipelines according to the source of the events, pipelines having events to be processed insert a flag in the associated ready list, and the associated scheduler repetitively scans the ready list sequentially, and releases events to the processor resource with preset limitation per pipeline.

2. The edge router of claim 1 wherein the preset limitation is a time limitation.

3. The edge router of claim 1 wherein the preset limitation is a buffer limitation.

4. A method for processing events in Border Gateway Protocol (BGP) peering in an edge router in a packet network, wherein individual ones of the BGP peers are Virtual Private Routed Networks (VPRNs) comprising acts of:

(a) placing received events associated with BGP peers in dedicated pipelines according to the BGP source;

(b) flagging a first ready list by individual pipelines associated with VPRNs having events ready to be processed;

(c) flagging a second ready list by individual pipelines associated with BGP peers that are not VPRNs having events ready to be processed; and (d) scanning the first and the second ready list sequentially and repeatedly by a first scheduler dedicated to the first ready list, and a second scheduler dedicated to the second ready list, the schedulers sending events for each pipeline to be processed to a processing resource according to a preset limitation per pipeline.

5. The method of claim 4 wherein in act (d) the preset limitation is a time limitation.

6. The method of claim 4 wherein in act (d) the preset limitation is a buffer limitation.

7. A machine-readable medium having stored there on a set of instructions that cause a machine to perform a method for processing events in Border Gateway Protocol (BGP) peering in an edge router in a packet network, including:

(a) placing received events associated with BGP peers in dedicated pipelines according to the BGP source;

(b) flagging a first ready list by individual pipelines associated with VPRNs having events ready to be processed;

(c) flagging a second ready list by individual pipelines associated with BGP peers that are not VPRNs having events ready to be processed; and (d) scanning the first and the second ready list sequentially and repeatedly by a first scheduler dedicated to the first ready list, and a second scheduler dedicated to the second ready list, the schedulers sending events for each pipeline to be processed to a processing resource according to a preset limitation per pipeline.

8. The medium of claim 7 wherein in act (d) the preset limitation is a time limitation.

9. The medium of claim 7 wherein in act (d) the preset limitation is a buffer limitation.

* * * * *

UNITED STATES PATENT AND TRADEMARK OFFICE
CERTIFICATE OF CORRECTION

PATENT NO. : 7,633,961 B2  Page 1 of 1
APPLICATION NO. : 10/820497
DATED : December 15, 2009
INVENTOR(S) : Raut et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1621 days.

Signed and Sealed this

Twenty-first Day of December, 2010

David J. Kappos
*Director of the United States Patent and Trademark Office*